United States Patent
Gotoh et al.

(10) Patent No.: US 8,248,659 B2
(45) Date of Patent: Aug. 21, 2012

(54) IMAGE PROCESSING APPARATUS, IMAGE PROCESSING METHOD, IMAGE FORMING APPARATUS, PROGRAM, AND RECORDING MEDIUM

(75) Inventors: Makio Gotoh, Nara (JP); Yuri Nakayama, Nara (JP); Masanori Minami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 819 days.

(21) Appl. No.: 12/396,897

(22) Filed: Mar. 3, 2009

(65) Prior Publication Data
US 2009/0225370 A1    Sep. 10, 2009

(30) Foreign Application Priority Data

Mar. 4, 2008  (JP) ................................ 2008-053736
Nov. 5, 2008  (JP) ................................ 2008-284289

(51) Int. Cl.
*H04N 1/40*  (2006.01)
*H04N 1/405*  (2006.01)

(52) U.S. Cl. ................ 358/3.03; 358/3.13; 358/3.06
(58) Field of Classification Search .............. 358/3.03, 358/1.2, 502, 3.06, 1.9, 1.18, 3.13, 3.19; 347/15, 43, 19, 41, 14
See application file for complete search history.

(56) References Cited

U.S. PATENT DOCUMENTS

| | | | |
|---|---|---|---|
| 6,328,404 B1 * | 12/2001 | Fujimori | 347/15 |
| 6,827,415 B2 * | 12/2004 | Otokita et al. | 347/14 |
| 7,965,419 B2 * | 6/2011 | Kakutani | 358/3.06 |
| 2001/0016065 A1 | 8/2001 | Yamamoto et al. | |
| 2006/0103322 A1 | 5/2006 | Chung et al. | |
| 2006/0262329 A1 | 11/2006 | Fujimori | |

FOREIGN PATENT DOCUMENTS

| | | |
|---|---|---|
| EP | 1533782 A2 | 5/2005 |
| JP | 2-301368 A | 12/1990 |
| JP | 7-123253 A | 5/1995 |
| JP | 8-204958 A | 8/1996 |
| JP | 11-69150 A | 3/1999 |
| JP | 2006-186755 | 7/2006 |

OTHER PUBLICATIONS

Choi et al., "P-11: An improved voltage programmed pixel structure for large size and high resolution AM-OLED displays," SID, 2004, DIGEST, pp. 260-263.

* cited by examiner

*Primary Examiner* — Charlotte M Baker
(74) *Attorney, Agent, or Firm* — Birch, Stewart, Kolasch & Birch, LLP

(57) ABSTRACT

An image processing apparatus is provided that restrains image quality deterioration of image data read with a resolution in a sub-scanning direction set lower than a resolution in a main scanning direction from a document containing text, halftone photographs, line drawings, photographs, etc. An image processing apparatus performs the tone reproduction processing by applying error diffusion processing to the image data that has undergone processing of making the resolution in the sub-scanning direction equal to the resolution in the main scanning direction when the resolution in the sub-scanning direction is lower than the resolution in the main scanning direction and applying dither processing to the image data in other case. When the resolution in the sub-scanning direction is lower than the resolution in the main scanning direction, the halftone processing is applied to the entire image data that sharpness and smoothing processing has been performed.

11 Claims, 10 Drawing Sheets

EXAMPLE OF DITHER MATRIX

EXAMPLE OF THRESHOLD MATRIX

FIG. 3A
EXAMPLE OF DITHER MATRIX
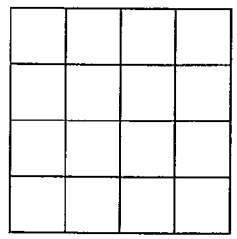
FIG. 3B
EXAMPLE OF THRESHOLD MATRIX
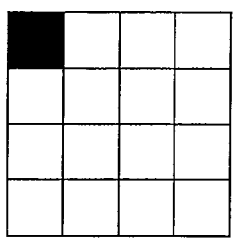 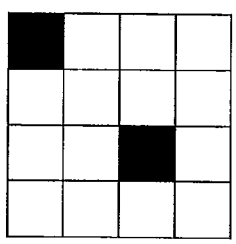 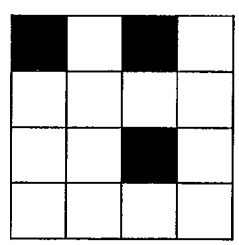 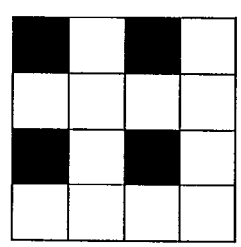
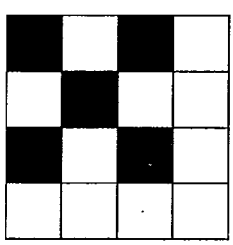 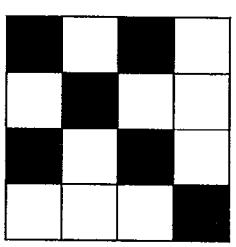 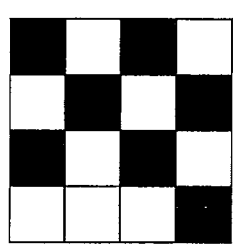 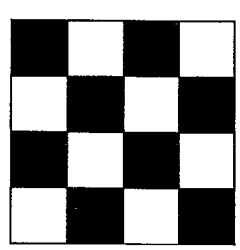
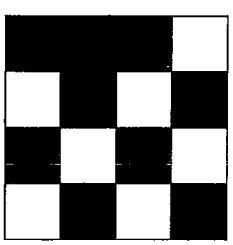 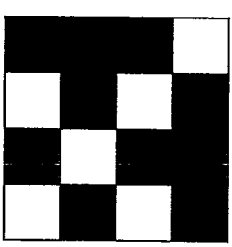 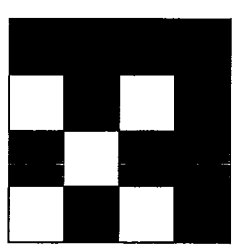 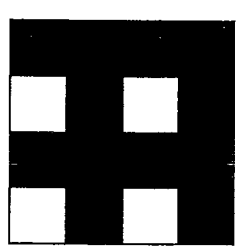
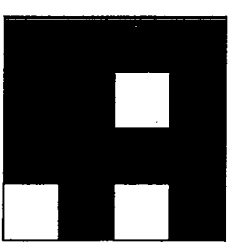 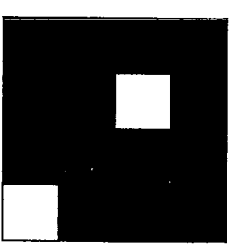 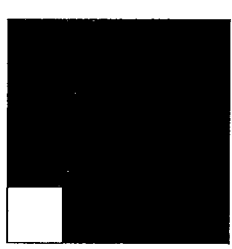 

FIG. 5

|  | QUANTIZED PIXEL * | 7/16 |
|---|---|---|
| 3/16 | 5/16 | 1/16 |

FIG. 6

|  |  | QUANTIZED PIXEL * | 15/16 | 6/64 |
|---|---|---|---|---|
| 4/64 | 2/64 | 10/64 | 8/64 | 4/64 |
| 1/64 | 4/64 | 6/64 | 4/64 | 0/64 |

| -4 | -3 | -3 | -2 | -3 | -3 | -4 |
|----|----|----|----|----|----|----|
| -3 | 2  | 4  | 10 | 4  | 2  | -3 |
| -3 | 4  | 15 | 20 | 15 | 4  | -3 |
| -2 | 10 | 20 | 20 | 20 | 10 | -2 |
| -3 | 4  | 15 | 20 | 15 | 4  | -3 |
| -3 | 2  | 4  | 10 | 4  | 2  | -3 |
| -4 | -3 | -3 | -2 | -3 | -3 | -4 |

IMAGE PROCESSING APPARATUS, IMAGE PROCESSING METHOD, IMAGE FORMING APPARATUS, PROGRAM, AND RECORDING MEDIUM

CROSS-NOTING PARAGRAPH

This non-provisional application claims priority under 35 U.S.C. §119(a) on Patent Application Nos. 2008-053736 filed in JAPAN on Mar. 4, 2008 and 2008-284289 filed in JAPAN on Nov. 5, 2008, the entire contents of which are hereby incorporated herein by reference.

FIELD OF THE INVENTION

The present invention relates to an image processing apparatus, an image processing method, an image forming apparatus, and a program and a recording medium that restrain image quality deterioration in reading at a resolution in a sub-scanning direction lower than a resolution in a main scanning direction and outputting with the resolution in the sub-scanning direction made equal to the resolution in the main scanning direction.

BACKGROUND OF THE INVENTION

In accordance with an advance in digital image processing technology, an image forming apparatus such as a copier and a printer using an electrophotographic process or an ink-jet system has come to be capable of reproducing a color image at high quality and a full-color digital copier and multi-functional peripheral are commercialized.

Document images to be copied with these image forming apparatuses include documents of text, halftone photographs, line drawings, photographs (continuous gray scale area such as a photograph), or documents of those mixed and to obtain a good reproduced image, it is necessary to perform image processing suitable for the type of component of each documents.

Segmentation processing is known that performs processing of segmenting into a text area, a halftone area, and others (a photograph area and an area such as page background not segmentable into the text area or the halftone area) using information of a mask centered around a target pixel (Japanese Laid-Open Patent Publication No. 11-69150), as a method of discriminating the type of image component of the documents.

In Japanese Laid-Open Patent Publication No. 11-69150, in the first image scanning, scanning is made at high speed, a document image is read at coarse resolution in the sub-scanning direction, and a macro segmentation section performs segmentation according to image structure as viewed in perspective and outputs a segmentation class signal. Then, the document image is read at low speed and a micro segmentation section performs area segmentation, paying attention to a difference in microscopic features of the image and outputs an image area signal. With the image area signal being selected based on the segmentation class signal output from the macro segmentation section, namely, by performing suitable image area segmentation according to results of the segmentation using the difference in macro structure features, accuracy may be improved of segmentation among text, gray scale edges, and smooth gray scale parts.

In Japanese Laid-Open Patent Publication No. 7-123253, in the case of, for example, image enlarging/reducing, etc., an image area segmentation standard for segmenting the type of the image area for each pixel is adjusted according to the reading speed, with respect to the image read at different image reading speed (resolution).

Since a change in the reading speed in the sub-scanning direction causes a change in sampling interval in the sub-scanning direction, frequency component of the image and direction of an edge in a slant direction apparently change. Accordingly, for example, with the sub-scanning speed at zoom level of 100% taken as a reference speed, when a speed ratio e of the reading speed in the sub-scanning direction to the reference speed is within the range of $1/2 \leq e < 1$ (zoom level=100 to 200%), threshold is adjusted in such direction that enables the edge component in the slant direction to be easily extracted and when the above reading speed is increased to the zoom level of less than 100% (reducing), the threshold is made equal to that of the reference speed, with respect to a halftone area.

In the case of extracting the edge, when the speed ratio e is within the range of $1 \leq e \leq 2$ (zoom level=50 to 100%), adjustment is made to such direction that enables an edge image to be more easily discriminated as the reading speed is decreased (so that the threshold will be lowered) and when the speed ratio is in the range less than 2/3 exceeding the zoom level of 150%, adjustment is made conversely so that the edge will be less easy to extract (Japanese Laid-Open Patent Publication Nos. 11-69150 and 7-123253).

While Japanese Laid-Open Patent Publication No. 11-69150 describes that in performing the segmentation, reading is made at coarse resolution of 200 dpi in the sub-scanning direction as opposed to the resolution of 600 dpi in the main scanning direction, increasing (e.g., three times) the reading speed (scanning speed) in the sub-scanning direction will cause image data to be thinned out and information on the image data to be lost, resulting in a decrease in the segmentation accuracy.

For example, in a pattern of lines parallel to the main scanning direction as shown in FIG. 13, when the resolution is same for both of the main scanning direction and the sub-scanning direction, results of reading may be obtained that correspond to the line pattern as shown in (A) but when the resolution is lower in the sub-scanning direction, the results of reading are obtained that appear to indicate presence of a gray scale area or light halftone instead of the line pattern as shown in (B).

Therefore, according to the method described in Japanese Laid-Open Patent Publication No. 11-69150, the accuracy is lowered of the segmentation of the image data in the sub-scanning direction and it is possible that inappropriate processing is applied.

According to the method described in Japanese Laid-Open Patent Publication No. 7-123253, it appears that erroneous discrimination may be reduced by changing the threshold at the time of performing area determination according to the reading speed (resolution) in the sub-scanning direction but it is possible that the erroneous discrimination may not be reduced depending on the method of setting the threshold.

SUMMARY OF THE INVENTION

It is the object of the present invention to provide an image processing apparatus, an image processing method, an image forming apparatus, and a program and a recording medium that restrain image quality deterioration of image data read with a resolution in a sub-scanning direction set lower than a resolution in a main scanning direction from a document containing text, halftone photographs, line drawings, photographs, etc.

The present invention has either one of the following features.

(1) In an image processing apparatus comprising at least a tone reproduction process section that applies halftone processing to input image data read in, the tone reproduction process section comprises a selecting section that selects: an error diffusion process section that applies error diffusion processing to the input image data, when a resolution in a sub-scanning direction is lower than a resolution in a main scanning direction as the input image data is read in; and a dither process section that applies dither processing to the input image data, when the resolution in the sub-scanning direction is equal to or higher than the resolution in the main scanning direction as the input image data is read in.

The image processing apparatus further comprises a segmentation process section that segments the input image data into plural areas comprising text areas and halftone areas; and a control section that turns off processing of the segmentation process section when the input image data has the resolution in the sub-scanning direction lower than the resolution in the main scanning direction.

The image processing apparatus may further comprise a filter process section that applies sharpness processing and smoothing processing to the input image data.

The image processing apparatus further comprises a color correction section that applies color correction processing to the input image data read in, wherein the color correction section performs: the color correction processing corresponding to the error diffusion processing when the resolution in the sub-scanning direction is lower than the resolution in the main scanning direction as the input image data is read in; and the color correction processing corresponding to the dither processing when the resolution in the sub-scanning direction is equal to or higher than the resolution in the main scanning direction as the input image data is read in. It may also be so arranged that output of unchanged hue will be obtained by switching to the color correction processing corresponding to the halftone processing even if the halftone processing is changed in response to the change of the input resolution.

An aspect of the present invention may provide an image processing method comprising at least a tone reproduction processing step of applying halftone processing to input image data read in, wherein the tone reproduction processing step comprises a selecting step of applying: error diffusion processing to the input image data when a resolution in a sub-scanning direction is lower than a resolution in a main scanning direction as the input image data is read in; and dither processing to the input image data when the resolution in the sub-scanning direction is equal to or higher than the resolution in the main scanning direction as the input image data is read in.

The image processing method may further comprise a segmentation processing step of segmenting the input image data into plural areas comprising text areas and halftone areas, wherein processing of the segmentation processing step is turned off when the resolution in the sub-scanning direction is lower than the resolution in the main scanning direction as the input image data is read in.

The image processing method may further comprise a filter processing step of applying sharpness processing and smoothing processing to the input image data.

The image processing method may further comprise a color correcting step of applying color correction processing to the input image data read in, wherein the color correcting step comprises the steps of: performing the color correction processing corresponding to the error diffusion processing on the input image data when the resolution in the sub-scanning direction is lower than the resolution in the main scanning direction as the input image data is read in; and performing the color correction processing corresponding to the dither processing on the input image data when the resolution in the sub-scanning direction is equal to or higher than the resolution in the main scanning direction as the input image data is read in.

(2) In an image processing apparatus that reads a document image at a resolution in a sub-scanning direction lower than a resolution in a main scanning direction and outputs after applying at least processing of making the resolution in the sub-scanning direction equal to the resolution in the main scanning direction, the apparatus comprises a tone reproduction process section that applies halftone processing by error diffusion processing to input image data.

The image processing apparatus may not comprise a segmentation process section that segments the input image data into plural areas comprising text areas and halftone areas.

The image processing apparatus may further comprise a filter process section that applies sharpness processing and smoothing processing to the input image data.

An image forming apparatus may be provided with the image processing apparatus.

A program code may be prepared for causing a computer to function as sections of the image processing apparatus or the program code may be recorded in a computer-readable recording medium such that the program code is executed by the computer.

BRIEF DESCRIPTION OF THE DRAWINGS

FIGS. 3A and 3B depict a dither matrix example composed of 4×4 pixels;

FIG. 5 depicts an example of a pixel diffusing a quantization error and a diffusion coefficient;

FIG. 6 depicts another example of the pixel diffusing the quantization error and the diffusion coefficient;

PREFERRED EMBODIMENTS OF THE INVENTION

Preferred embodiment according to the present invention will now be described with reference to the drawings.

Figure 1:
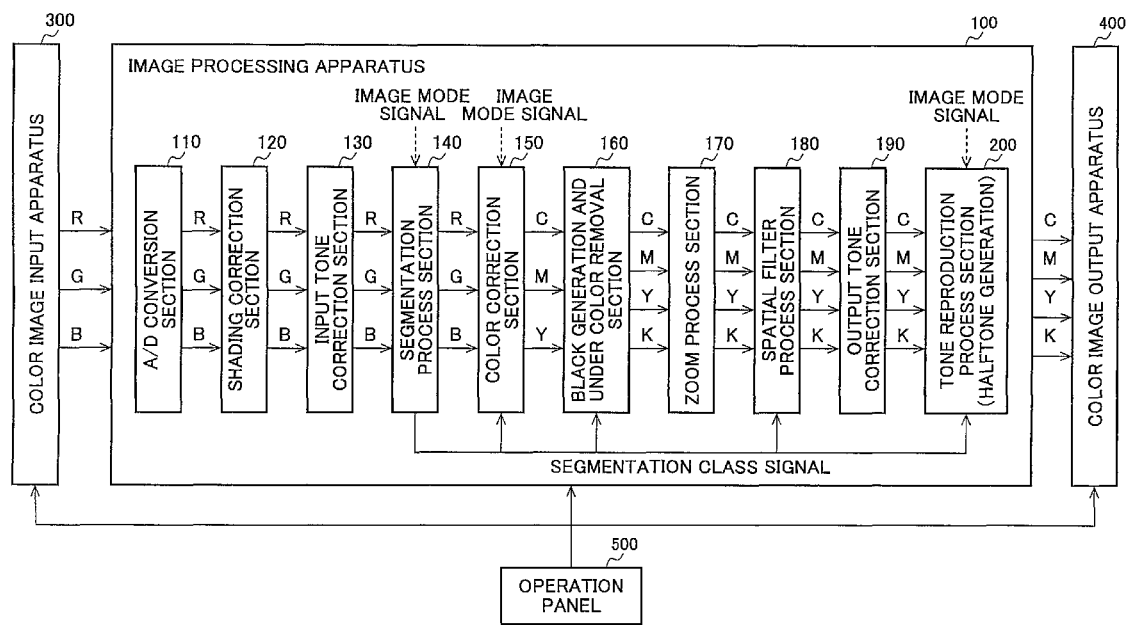
FIG. 1 is a block diagram of configuration of an image processing apparatus of the present invention.

FIG. 1 is a block diagram depicting configuration of an image processing apparatus of the present invention. In FIG. 1, an image processing apparatus 100 comprises an A/D conversion section 110, a shading correction section 120, an input tone correction section 130, a segmentation process section 140, a color correction section 150, a black generation and under color removal section 160, a zoom process section 170, a spatial filter process section 180, an output tone correction section 190, and a tone reproduction process section 200 that performs halftone generation processing and, with a color image input apparatus 300, a color image output apparatus 400, and an operation panel 500 added thereto, makes up a digital color copier (image forming apparatus) as a whole.

The color image input apparatus 300 comprising a scanning section equipped with, e.g., a CCD (Charge Coupled Device) reads a reflected light image from a document as analog signals of RGB (R:red, G:green, B:blue) by the CCD and inputs these signals to the image processing apparatus 100.

The analog signals read by the color image input apparatus 300 are transmitted inside the image processing apparatus 100 in the order of the A/D conversion section 110, the shading correction section 120, the input tone correction section 130, the segmentation process section 140, the color correction section 150, the black generation and under color removal section 160, the zoom process section 170, the spatial filter process section 180, the output tone correction section 190, and the tone reproduction process section 200 and are output to the color image output apparatus 400 as digital color signals of CMYK (C:cyan, M:magenta, Y:yellow, K:black).

The A/D (analog/digital) conversion section 110 converts the analog signals of RGB to digital signals and the shading correction section 120 applies processing of removing various distortions caused in an illumination system, an image focusing system, and an image sensing system of the color image input apparatus 300 to the digital RGB signals transmitted from the A/D conversion section 110.

The input tone correction section 130 converts the RGB signals (reflectivity signals of RGB) to signals such as density signals that are easy to handle for an image processing system employed in the color image processing apparatus, adjusts color balance, and performs processing of adjusting image quality such as removing page background density and contract.

The segmentation process section 140 segments each pixel in the input image into, for example, a text area, a halftone area, and other area, based on the RGB signals. The segmentation process section 140 outputs, based on results of segmentation, a segmentation class signal indicative of to which area the pixel belongs to the color correction section 150, the black generation and under color removal section 160, the spatial filter process section 180, and the tone reproduction process section 200 and at the same time, outputs the signals input from the input tone correction section 130, without any modification, to the subsequent color correction section 150.

As to a segmentation process method, a method may be cited that segments each pixel into the text area, the halftone area, a photograph area (continuous tone image area), and a page background area by calculating maximum density difference and total density complexity as an amount of characteristic and comparing these values with plural threshold values, as described in, for example, Japanese Laid-Open Patent Publication No. 2002-232708.

The color correction section 150 performs processing of removing color impurity based on spectroscopic characteristic of CMY color materials containing an unnecessary absorbing component for realizing faithful color reproduction. The color correction section 150 performs the color correction processing corresponding to error diffusion processing when a resolution in a sub-scanning direction of input image data is lower than a resolution in a main scanning direction and performs the color correction processing corresponding to dither processing when the resolution in the sub-scanning direction of the input image data is higher than the resolution in the main scanning direction. Details of the color correction section 150 will be described later.

The black generation and under color removal section 160 performs black generation of generating a black (K) signal from three color signals of CMY after the color correction and processing of generating new CMY signals by subtracting the K signal obtained by the black generation from original CMY signals, and the three color signals of CMY are converted to four color signals of CMYK.

One example of the black generation processing is a method of generating black by skeleton black (a general method). In this method, if input output characteristic of skeleton curve is given as y=f(x), data to be input being given as C,M,Y, data to be output being given as C',M',Y',K', UCR (Under Cover Removal) ratio being given as $\alpha(0<\alpha<1)$, then the black generation and under color removal processing is expressed by the following Equation 1:

$$K'=f\{\min(C,M,Y)\} \quad [\text{Eq. 1}]$$

$$C'=C-\alpha K' \quad (1)$$

$$M'=M-\alpha K'$$

$$Y'=Y-\alpha K'$$

The zoom process section 170 performs enlarging/reducing processing based on a zoom level input from the operation panel 500. Zoom processing may also be performed by interpolation calculation both in the main scanning direction and in the sub-scanning direction or by the interpolation calculation only in the main scanning direction, with optical processing performed in the sub-scanning direction.

The spatial filter process section 180 performs processing for preventing blurring and granularity deterioration of the output image by applying the spatial filter processing by a digital filter to the image data of the CMYK signals input from the black generation and under color removal section 160, based on the segmentation class signal and correcting characteristic of spatial frequency. The tone reproduction process section 200, like the spatial filter process section 180, applies predetermined processing to the image data of the CMYK signals, based on the segmentation class signal.

For example, in the area segmented as a text area at the segmentation process section 140, the spatial filter process section 180 strongly sharpens a high frequency component in an enhancement process of the spatial filter process to improve reproductivity of, in particular, achromatic text or chromatic text. At the same time, in the tone reproduction process section 200, binarizing or multi-level dithering processing is selected on a high-resolution screen suitable for reproduction of upper frequency.

In the area segmented as a halftone area at the segmentation process section 140, the spatial filter process section 180 performs low-pass filter processing to remove an input halftone component.

The output tone correction section 190 performs output tone correction processing of converting signals such as a density signal to a halftone area ratio as a characteristics of the color image output apparatus 400 and thereafter, the tone reproduction process section 200 performs the tone reproduction processing (halftone generation) of processing so that the image may finally be separated into pixels and each tone of the pixels may be reproduced. In the area segmented as a photograph area at the segmentation process section 140, the binarization or multi-level dithering process is performed suitable for tone reproduction.

The operation panel 500 is composed of, for example, a display section such as a liquid crystal display, a setting button, etc., and the operation of the color image input apparatus 300, the image processing apparatus 100, and the color image output apparatus 400 is controlled based on the information input through the operation panel 500.

The image data processed by the image processing apparatus 100 is temporary memorized in a storage apparatus and is read out at a predetermined timing to be input to the color image output apparatus 400. The color image output apparatus 400 is a apparatus to output the image data on a recording medium (such as paper) and for example, a color image output apparatus, etc, employing an electrophotographic process or an ink-jet process may be cited but the color image output apparatus 400 is not particularly limited to these.

The above processing is controlled by a control section composed of a CPU (Central Processing Unit) or a DSP (Digital Signal Processor) not shown.

Operation will now be described in detail of the image processing apparatus 100 when an image mode is specified.

The image mode as used herein means either a speed process priority mode or an image quality priority mode.

The speed process priority mode means the case of setting the resolution in the sub-scanning direction lower than the resolution in the main scanning direction, to make the scanning speed higher than a default value and for example, the case of setting the resolution in the sub-scanning direction at 300 dpi as opposed to the resolution in the main scanning direction set at 600 dpi, to double the scanning speed.

The image quality priority mode means the case of setting the resolution in the sub-scanning direction higher than the resolution in the main scanning direction, to give priority to the image quality and for example, the case of halving the scanning speed by setting the resolution in the sub-scanning direction at 1200 dpi as opposed to the resolution in the main scanning direction set at 600 dpi.

The image mode is specified by a user through the operation panel 500 or, when the image processing apparatus is connected to a network, etc., is set as an operation condition of the scanner by a personal computer, etc., and transmitted to the image processing apparatus together with the image data.

Conventionally, one technique of the tone reproduction processing is multi-level dither processing which, for example, performs quantizing processing on each pixel of a dither matrix, based on a relation of magnitude with plural threshold values corresponding thereto and processing of outputting any one of plural output values or outputting the output value converted based on a conversion table.

Figure 2A:
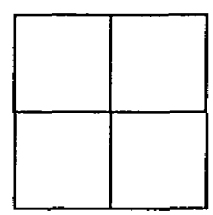
FIGS. 2A and 2B depict a dither matrix example composed of 2×2 pixels.
Figure 2B:
Figure 4:
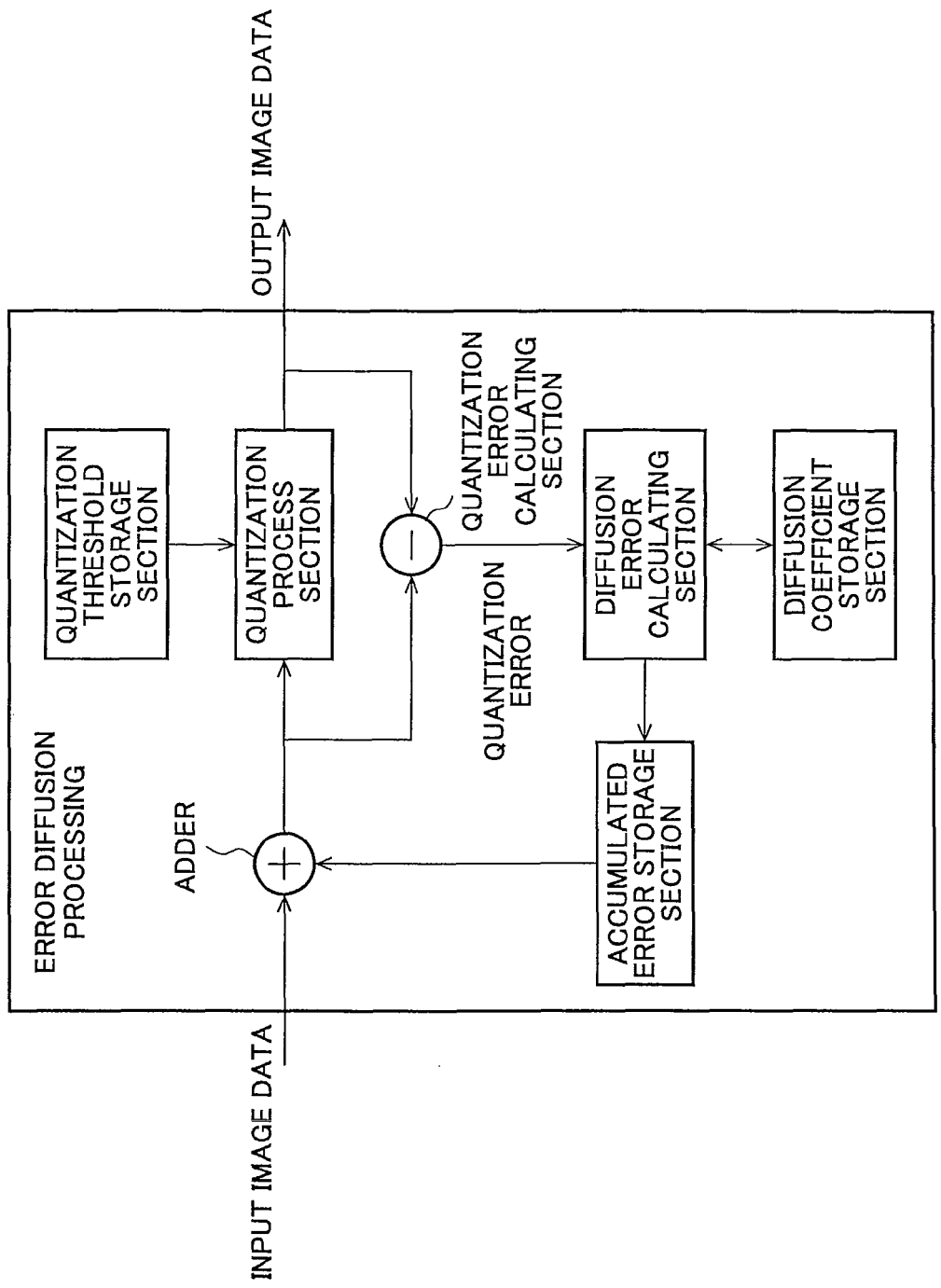
FIG. 4 is a block diagram of configuration of error diffusion processing.

The dither processing is performed using the dither matrix composed of, for example, 2×2 pixels as shown in FIG. 2A or 4×4 pixels as shown in FIG. 3A. A threshold matrix of FIGS. 2B and 3B represents the threshold values indicative of how to control dot outputting and the examples show the case of outputting in binary but setting maybe made with the same concept in the case of outputting in multiple level (multi-level dither) as well. FIGS. 2B and 3B show that the threshold values are set so that the dot is output in the order of the pixel painted out as black.

Another technique of the tone reproduction processing is the error diffusion processing that is a method of diffusing a quantization error caused at the time of quantizing each pixel (e.g., binarizing) to a neighboring pixel not yet quantized while weighting is given thereto. If the pixel to be quantized is referred to as a target pixel, the quantization error of the target pixel may be obtained by giving weighting to each pre-quantizing pixel located in its neighborhood according to a relative position from the target pixel and adding such weightings.

As shown in FIG. 4, an error diffusion process section comprises an adder, a quantization process section, a quantization threshold storage section, a quantization error calculating section composed of a subtracter, a diffusion error calculating section, a diffusion coefficient storage section, and an accumulated error storage section.

The adder adds an accumulated error stored in the accumulated error storage section to a pixel value (density value of color component) of the input image data. This accumulated error storage section stores the accumulated error calculated by the diffusion error calculating section.

The quantization process section performs quantization by comparing the pixel value of the input image data with the accumulated error added thereto and a quantization threshold stored in the quantization threshold storage section.

The quantization error calculating section calculates the quantization error by subtracting the input image data with the accumulated error added thereto by the adder from a quantized value quantized by the quantization process section (hereinafter, quantized value of output image data).

The diffusion error calculating section calculates a diffusion error to be diffused to the pixel value of the input image data yet to be processed based on the quantization error calculated by the quantization error calculating section and a predetermined diffusion coefficient stored in the diffusion coefficient storage section and records it in the accumulated error storage section.

For example, FIGS. 5 and 6 show, relative to the quantized pixel (target pixel indicated by an asterisk), the pixel to which the quantization error is to be diffused and the diffusion coefficient thereof.

When the image is read at the resolution in the sub-scanning direction lower than the resolution in the main scanning direction, the error diffusion processing mitigates dot irregularity, which causes no moire and therefore enables smoothing by the filter processing to be weakened. For example, even if a text area is misjudged as a halftone area, the text area is weakly smoothed and therefore, deterioration of the image quality may be restrained.

Therefore, arrangement is made so that in the speed process priority mode, the tone reproduction process section 200 performs the halftone generation processing using the error diffusion processing as a known method and in the image quality priority mode, the tone reproduction process section 200 performs the halftone generation processing using the dither processing as a known method.

Figure 7:
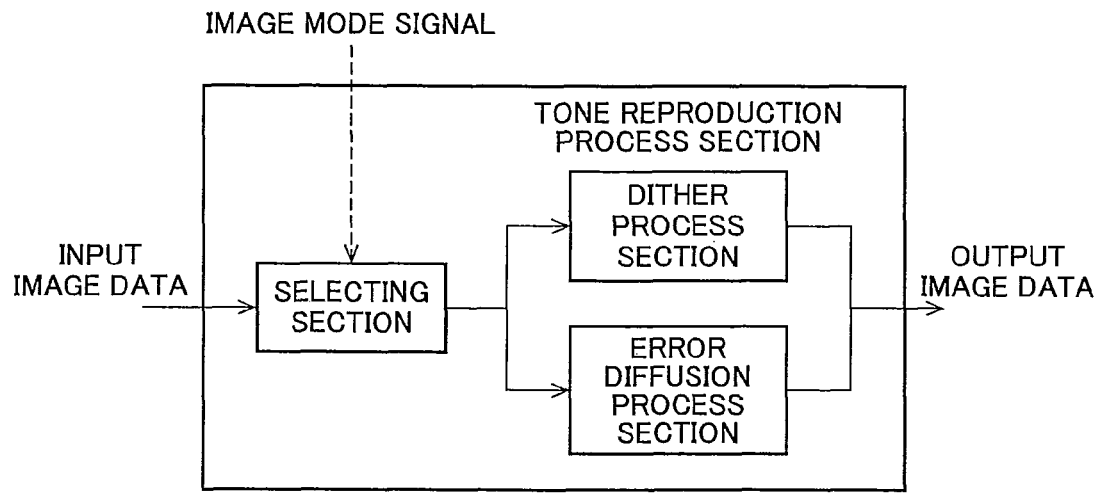
FIG. 7 is a block diagram of schematic configuration of a tone reproduction process section.

For example, the tone reproduction process section 200 comprises a selecting section, a dither process section, and an error diffusion process section as exemplified in FIG. 7 and the selecting section, referring to the image mode when the image data is input, outputs the input image data to the error diffusion process section when the image mode is the speed process priority mode and to the dither process section when the image mode is the image quality priority mode.

Details will be described of the color correction section 150 with reference to FIG. 8.

Since a dot pattern output on the paper greatly differs between the dither processing and the error diffusion processing, the way of overlapping of the dots of each color varies. As a result, variation of area of each color appearing on the surface causes discrepancy in characteristic of color reproduction and therefore, the color correction processing needs to be switched between the dither processing and the error diffusion processing.

When the speed process priority mode is selected, the color correction section 150 performs the color correction processing corresponding to the error diffusion processing and the tone reproduction process section 200 performs the halftone generation processing using the error diffusion processing as described above.

When the image quality priority mode is selected, the color correction section 150 performs the color correction processing corresponding to the dither processing and the tone reproduction process section 200 performs the halftone generation processing using the dither processing as described above.

Figure 8:
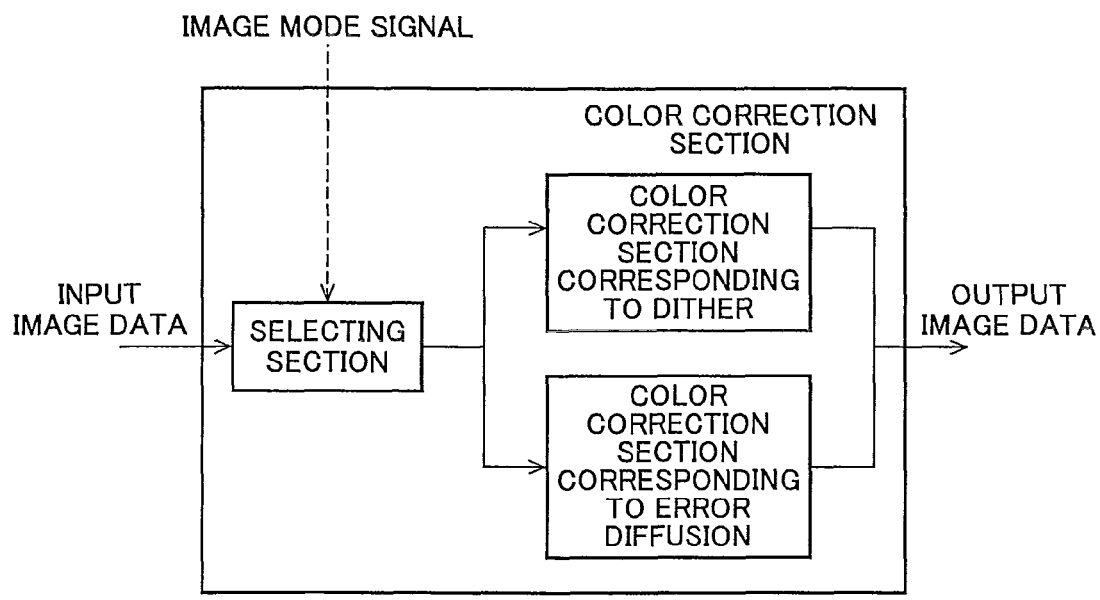
FIG. 8 is a diagram of configuration of a color correction section.

As shown in FIG. 8, in the color correction section, a selecting section switches between the color correction processing corresponding to the dither and the color correction processing corresponding to the error diffusion. The color correction section performs the color correction processing using an LUT (Lookup Table). The LUT is a memory memorizing an output signal corresponding to an input signal. In this case, the LUT is used that memorizes the CMY signals as the color signals of the color image forming apparatus corresponding to the RGB signals as the color signals of the color image input apparatus.

When the color correction processing corresponding to the dither is selected, the color correction section converts the input image data to the output image data for outputting, using a color correction LUT suitable for the output characteristic of the dither processing and when the color correction processing corresponding to the error diffusion is selected, the color correction section converts the input image data to the output image data for outputting, using the color correction LUT suitable for the output characteristic of the error diffusion processing.

To prepare the color correction LUT corresponding to the error diffusion processing and the dither processing, "Color Calibration System Using Neural Networks" may be used that is described at pp. 15-19 of Sharp Technical Bulletin No. 76 (April, 2000). This method is to prepare an input model representing correspondence between the color characteristic of the document and the color signals of RGB of the image input apparatus and an output model representing correspondence between the color signals of CMY of the image output apparatus and the color characteristic of output printing and use these models to prepare the LUT memorizing output CMY signals corresponding to common color characteristics. The CMY signals corresponding to the input signals are taken out from this color correction LUT and are output to a subsequent processing section.

As used herein, L*a*b* (CIE1976 L*a*b* signal (CIE: Commission International de l'Eclairage: International Illumination Commission, L*: lightness, a*: redness-greenness, b*: yellowness-blueness)) value represents the color characteristic.

The neural network made to learn the correspondence between the RGB signals as color space of the image input apparatus 300 and the L*a*b* value is used as an input model neural network.

The neural network made to learn the correspondence between the T,*a*b* and the CMY as color space of the image output apparatus 400 is used as an output model neural network.

To prepare the LUT corresponding to the dither processing, the neural network is made to learn the color reproduction characteristic in the case of outputting using the dither processing from the color image output apparatus, as the output model neural network. To prepare the LUT corresponding to the error diffusion processing, the neural network is made to learn the color reproduction characteristic in the case of outputting using the error diffusion processing from the color image output apparatus, as the output model neural network. The color correction LUT is prepared for each processing and the LUT to be used is switched according to the image mode.

As above, the color correction section performs the color correction processing corresponding to the error diffusion processing when the resolution in the sub-scanning direction is lower than the resolution in the main scanning direction (e.g., resolution of 600 dpi×300 dpi) as the input image data is read in and performs the color correction processing corresponding to the dither processing when the resolution in the sub-scanning direction is equal to or higher than the resolution in the main scanning direction as the input image data is read in and accordingly, even if the halftone processing is changed in response to the change of the input resolution, switching to the color correction processing corresponding to the halftone processing enables obtaining the output with hue unchanged.

The image quality deterioration may possibly be restrained without the segmentation processing and in such case, the segmentation processing (at the segmentation process section 140) may be omitted by turning off the segmentation processing.

In this case, new problems arise as follows.

(1) When the filter processing is not performed, there remain granularity by halftone and non-uniformity of the density (pixel value) due to noises at the time of reading the document by the scanner and text is not clear.

(2) When the smoothing processing is applied to the image as a whole, text blurs.

(3) When the sharpness processing is applied to the image as a whole, there remain granularity by halftone and non-uniformity of the density (pixel value) due to noises at the time of reading the document by the scanner and the halftone area is emphasized and therefore, color hue is caused to change.

These problems may be solved by performing sharpness and smoothing filter processing on the entire area of the image.

Figures 9, 10:
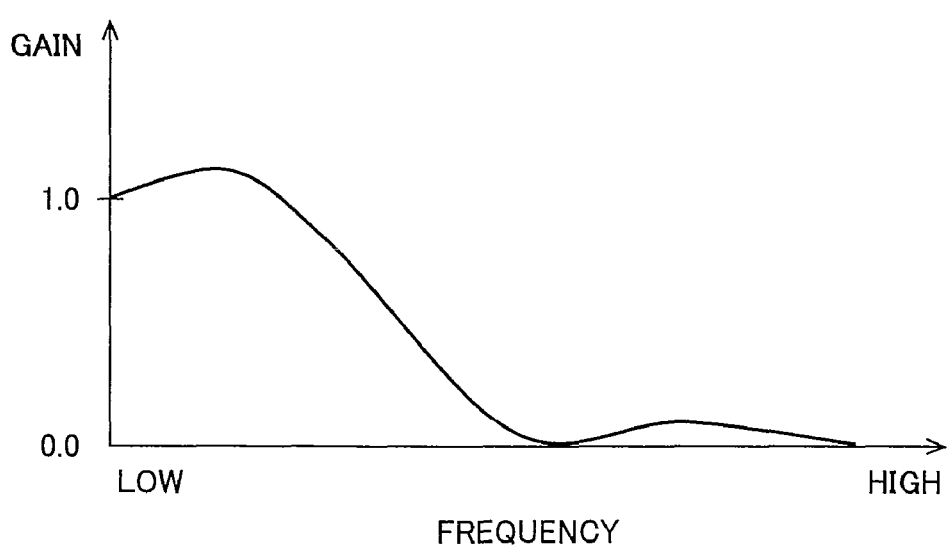
FIG. 9 depicts an example of a filter coefficient of a sharpness and smoothing filter.
FIG. 10 depicts an example of frequency characteristic of the sharpness and smoothing filter.

The sharpness and smoothing filter processing represents a filter having smoothing characteristic in a high frequency range and sharpness characteristic in a low frequency range, which has a filter coefficient as exemplified in FIG. 9 and frequency characteristic as exemplified in FIG. 10.

When the segmentation processing is turned off, it is so arranged that the spatial filter process section 180 will apply the sharpness and smoothing filter processing to the image data as a whole and the tone reproduction process section 200 will perform the halftone generation processing using the error diffusion processing on the image data as a whole.

With the above configuration, when the image is read at the resolution in the sub-scanning direction lower than the resolution in the main scanning direction, the segmentation accuracy is lowered but the use of the error diffusion processing as the halftone processing causes no moire. Therefore, the smoothing by the filter processing may be weakened and for example, even if a text area is misjudged as a halftone area, the text area is weakly smoothed and therefore, the image quality deterioration may be restrained.

When the segmentation processing is not performed, the sharpness and smoothing filter processing that applies the sharpness processing and the smoothing processing may restrain the granularity by halftone and the non-uniformity due to noises at the time of reading the document by the scanner and may express text clearly. The change of color hue of the halftone area may be restrained (difference between the color hue of the document and the color hue of the output image may be reduced).

Instead of turning off the segmentation processing, it may be so arranged that only in the case of performing the halftone generation processing (error diffusion processing), the processing (in this case, parameters of the error diffusion processing such as the diffusion coefficient) will not be switched by the segmentation class signal. When the image is read at the resolution in the sub-scanning direction lower than the resolution in the main scanning direction, misjudgment may be involved in results of segmentation and by switching the processing, a gap may possibly occur at a border area where the processing is switched. As described above, however, by arranging so that the processing will not be switched by the segmentation class signal, occurrence of the gap may be restrained.

When the speed process priority mode or the image quality priority mode is specified, the resolution in the sub-scanning direction differs from the resolution in the main scanning direction. Accordingly, the zoom process section 170 performs resolution conversion processing (interpolation processing) so that the resolution in the sub-scanning direction will be the same as the resolution in the main scanning direction. When the document is read by doubling the scanning speed in the speed process priority mode, namely, at the resolution of 600 dpi×300 dpi, the resolution in the sub-scanning direction is 300 dpi as opposed to the resolution in the main scanning direction of 600 dpi and therefore, the interpolation processing of the image data is performed so that the resolution in the sub-scanning direction will be 600 dpi.

The following known methods may be used for the interpolation processing.

(1) The interpolation processing by nearest neighbor takes the value of the existing pixel that is nearest to the pixel to be interpolated or is in a predetermined positional relationship with the pixel to be interpolated as the value of the interpolation pixel.

(2) The interpolation processing by bilinear calculates an average of values of four surrounding pixels around the pixel to be interpolated, weighted in proportion to respective distances and takes the value as that of the interpolation pixel.

(3) The interpolation processing by bicubic performs interpolation calculation using values of total 16 pixels of the four pixels surrounding the pixel to be interpolated and additionally 12 pixels surrounding such four pixels.

Figure 11:
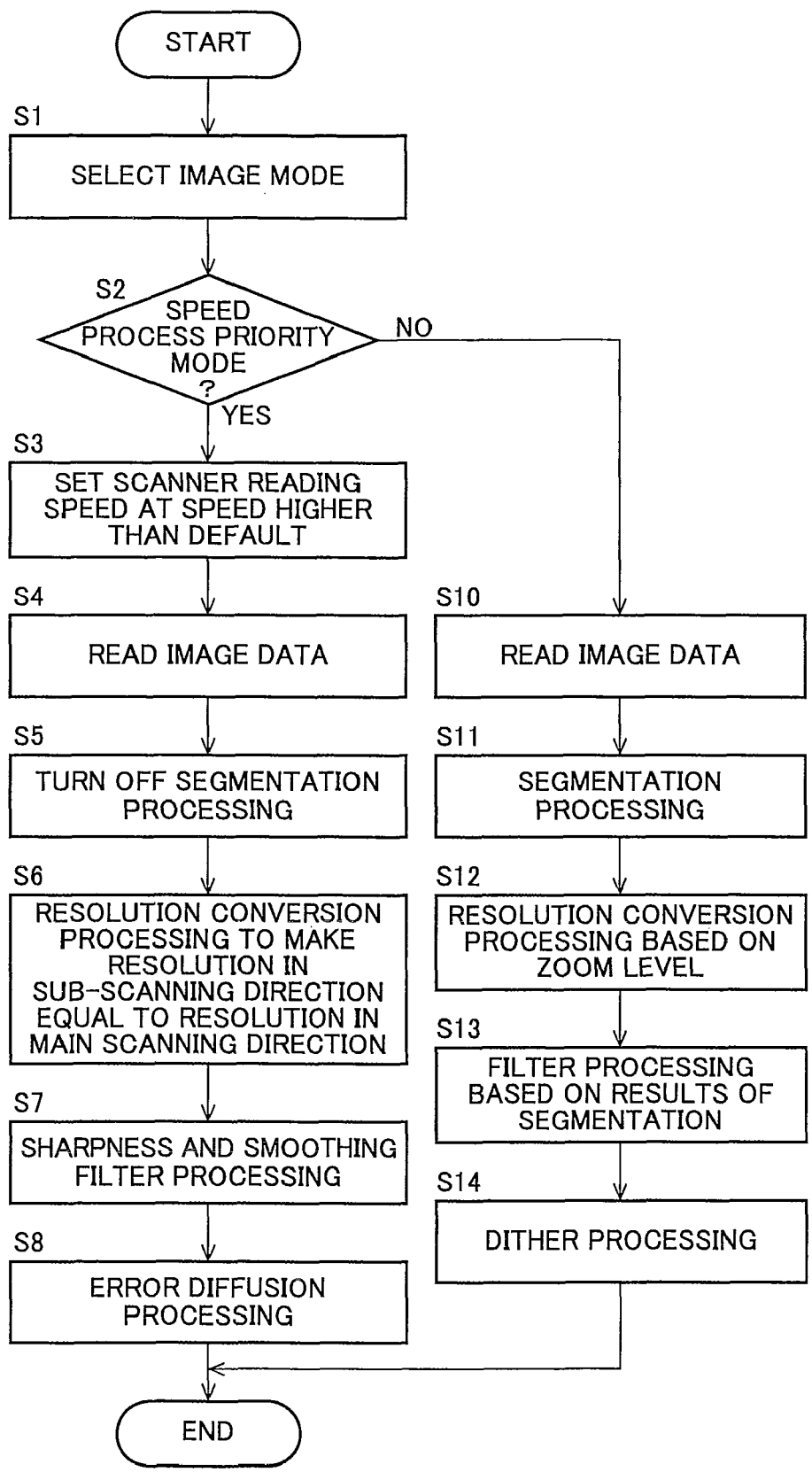
FIG. 11 is a flowchart describing an over-all procedure in the present embodiment.

An over-all procedure in the present embodiment will now be described with reference to a flowchart of FIG. 11.

The image mode is determined that is selected by the user through the operation panel 500 (step S1) and if the selected mode is the speed process priority mode (step S2: Yes), then processing of steps S3 to S8 is performed. On the other hand, if the selected mode is not the speed process priority mode (step S2: No), then processing of steps S10 to S14 is performed.

In the case of the speed process priority mode, the scanner reading speed is set at the speed higher than the default (step S3), the document is read, and the analog signal by the reading is transmitted to the A/D conversion section 110, the shading correction section 120, the input tone correction section 130, the color correction section 150, and the black generation and under color removal section 160 in that order (step S4).

In this case, the segmentation processing is not performed (step S5) and the zoom process section 170 applies the resolution conversion processing (interpolation processing) to the image data that has undergone the above processing so that the resolution in the sub-scanning direction will be the same as the resolution in the main scanning direction (step S6). The spatial filter process section 180 applies the sharpness and smoothing filter processing having the smoothing characteristic in the high frequency range and the sharpness characteristic in the low frequency range to the entire area of the image, the output tone correction section 190 performs the output tone correction (step S7), and the tone reproduction process section 200 applies the error diffusion processing as the halftone processing to the entire area of the image and outputs the image data to the color image output apparatus 400 (step S8).

In the case of the image quality priority mode (other than the speed process priority mode), the document is read at the default speed as the scanner reading speed and the analog signal by the reading is transmitted to the A/D conversion section 110, the shading correction section 120, and the input tone correction section 130 in that order (step S10).

The image data that has undergone the segmentation processing by the segmentation process section 140, is transmitted to the color correction section 150 and the black generation and under color removal section 160 in that order (step S11).

When the zoom level is specified for the enlargement or reduction, the zoom process section 170 applies the resolution conversion processing (interpolation processing) to the image data so far processed (step S12) and the spatial filter process section 180 applies the filter processing to the image data based on the results of the segmentation and transmits the image data that has undergone the spatial filter processing to the output tone correction section 190 (step S13). When the zoom level is not specified (at zoom level of 100%), the resolution conversion processing is not performed at the zoom process section 170.

The tone reproduction process section 200 applies the dither processing based on the results of the segmentation as the halftone processing and outputs the image data to the color image output apparatus 400 (step S14)

In the above embodiment, the image forming apparatus that has the reading speed in the sub-scanning direction set and fixed at the high speed (has the resolution in the sub-scanning direction set at the low resolution from the beginning) may be configured not to have the segmentation process section 140. In this case, with respect to the halftone processing, the dither processing is not used and the error diffusion processing is performed on the entire area of the image.

In the above embodiment, the image forming apparatus may be configured to have the color image input apparatus 300, an image reading apparatus equipped with the image processing apparatus comprising the A/D conversion section 110, the shading correction section 120, the input tone correction section 130, and the segmentation process section 140, and the printer or the multi-functional peripheral connected thereto by way of the network. The printer or the multi-functional peripheral is equipped with the color correction section 150, the black generation and under color removal section 160, the zoom process section 170, the spatial filter process section 180, the output tone correction section 190, and the tone reproduction process section 200. For example, when the speed process priority mode or the image quality priority mode is selected on a scanner driver setting screen of the computer, the above processing is performed based on the image data and the above image mode signal containing the resolution in the sub-scanning direction to be output from the image reading apparatus in either case. When the above image mode is not selected, the above image reading apparatus outputs the image data and the segmentation class signal and the printer or the multi-functional peripheral processes the image data based on the segmentation class signal.

Figure 12:
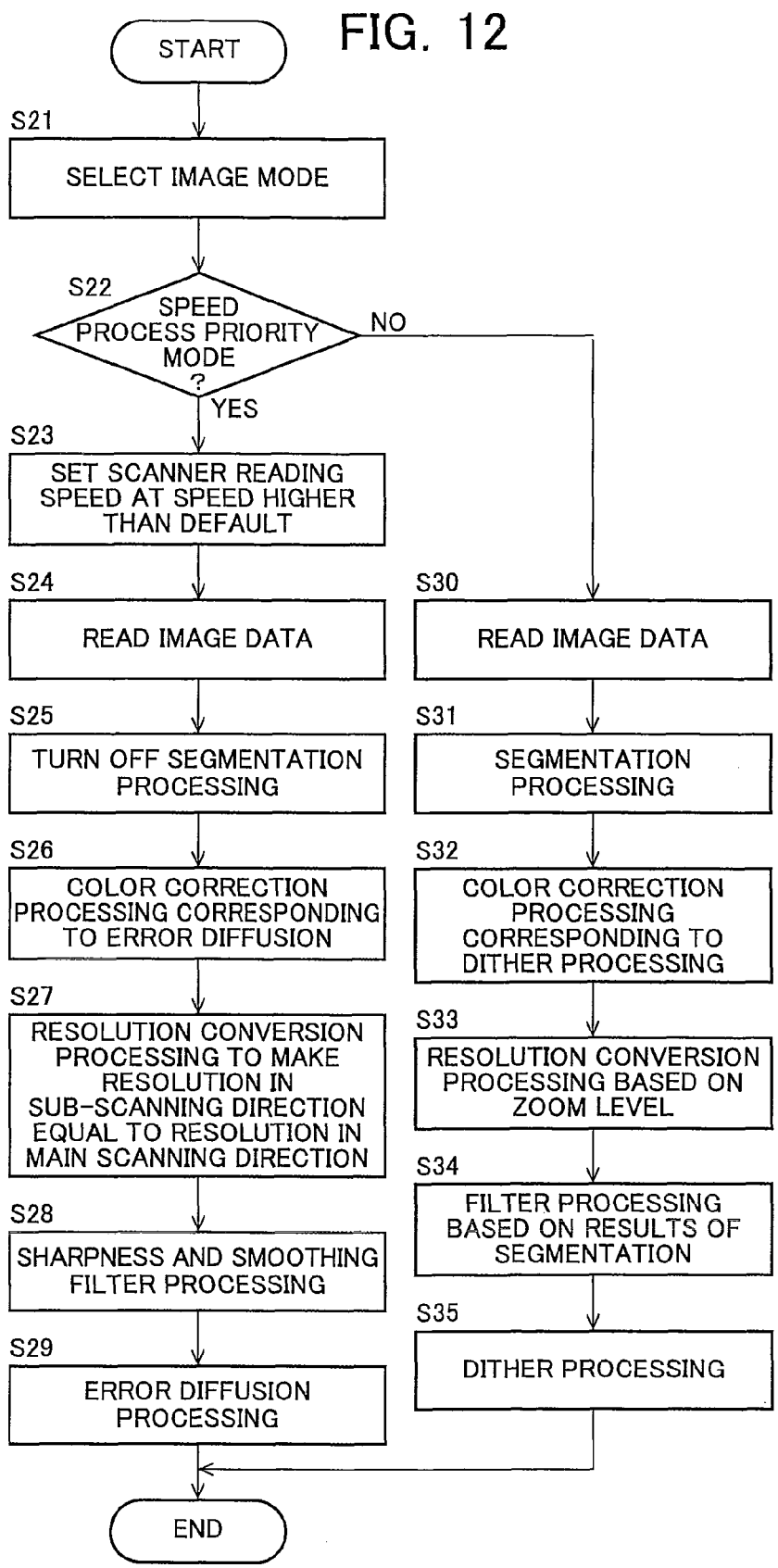
FIG. 12 is a flowchart describing a procedure for switching color correction processing according to an image mode signal in the present embodiment.
Figure 13:
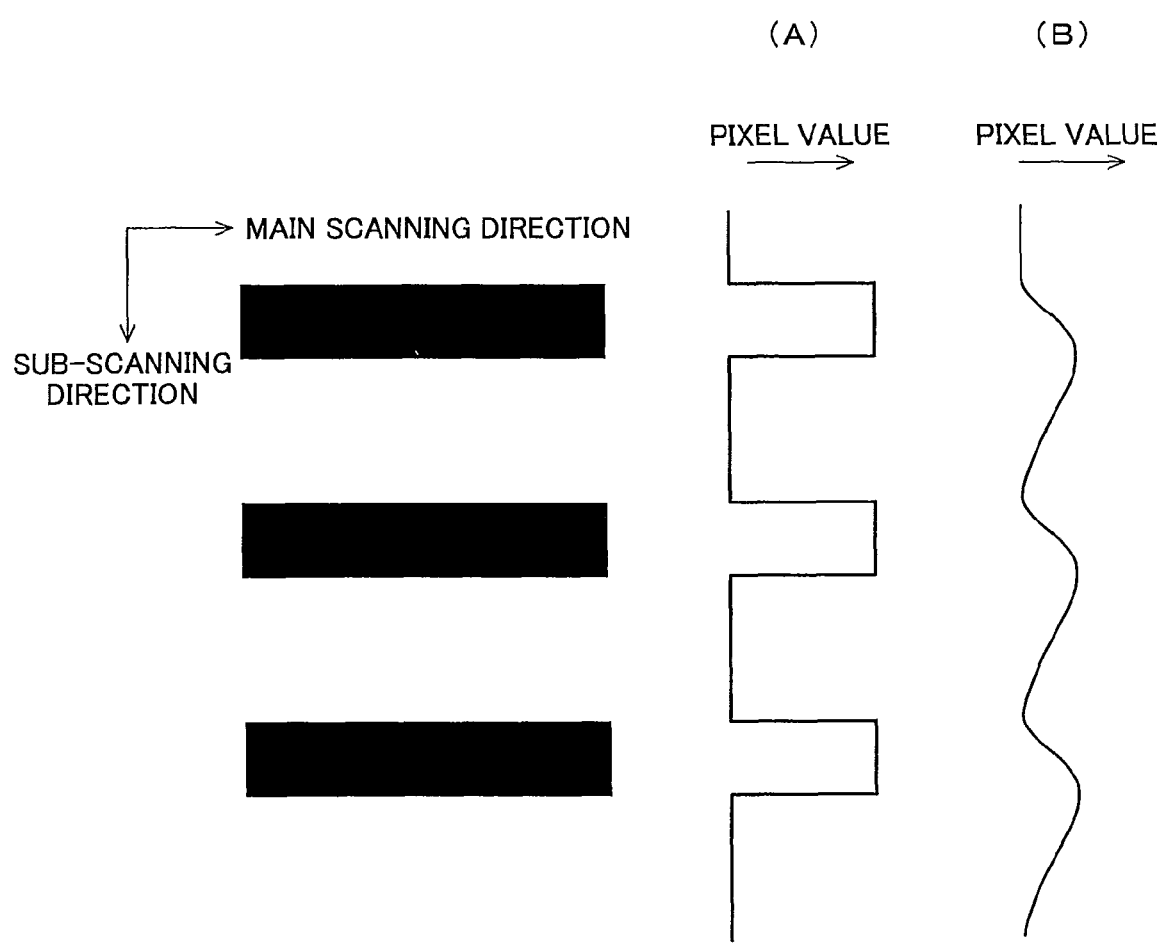
FIG. 13 is a diagram for explanation of lowering of segmentation accuracy when a resolution in a sub-scanning direction is lower than a resolution in a main scanning direction.

A procedure will now be described of switching the color correction processing according to the image mode signal with reference to the flowchart of FIG. 12.

The priority mode is read that is selected by the user through the operation panel 500 (step S21) and if the selected mode is the speed process priority mode (step 22: Yes), then processing of steps S23 to S29 is performed. On the other hand, if the selected mode is not the speed process priority mode (step S22: No), then processing of steps S30 to S35 is performed.

In the case of the speed process priority mode, the scanner reading speed is set at the speed higher than the default (step S23), the document is read, and the analog signal by the reading is transmitted to the A/D conversion section 110, the shading correction section 120, the input tone correction section 130, the color correction section 150, and the black generation and under color removal section 160 in that order (step S24).

In this case, the segmentation processing is not performed (step S25), the color correction section 150 performs the color correction processing using the color correction LUT corresponding to the error diffusion, the black generation and under color removal section 160 performs the black generation and under color removal processing (step S26), and the zoom process section 170 applies the resolution conversion processing (interpolation processing) to the image data output from the black generation and under color removal section 160 so that the resolution in the sub-scanning direction will be the same as the resolution in the main scanning direction (step S27) The spatial filter process section 180 applies the sharpness and smoothing filter processing having the smoothing characteristic in the high frequency range and the sharpness characteristic in the low frequency range to the entire area of the image, the output tone correction section 190 performs the output tone correction (step S28), and the tone reproduction process section 200 applies the error diffusion processing to the entire area of the image as the halftone processing and outputs the image data to the color image output apparatus 400 (step S29).

In the case of the image quality priority mode (other than the speed process priority mode), the document is read at the default speed as the scanner reading speed (step S30) and the analog signal by the reading is transmitted to the A/D conversion section 110, the shading correction section 120, and the input tone correction section 130 in that order.

The segmentation process section 140 performs the segmentation processing (step S31) and then the image data undergoes the color correction processing corresponding to the dither processing at the color correction section 150 and the black generation and under color removal processing at the black generation and under color removal section 160 (step S32).

When the zoom level is specified for the enlargement or reduction, the zoom process section 170 applies the resolution conversion processing (interpolation processing) to the image data output from the black generation and under color removal section 160 (step S33) and the spatial filter process section 180 applies the filter processing to the image data based on the results of the segmentation and transmits the image data that has undergone the spatial filter processing to the output tone correction section 190 (step S34). When the zoom level is not specified (at zoom level of 100%), the resolution conversion processing is not performed at the zoom process section 170.

The tone reproduction process section 200 applies the dither processing based on the results of the segmentation as the halftone processing and outputs the image data to the color image output apparatus 400 (step S35).

As above, the color correction section performs the color correction processing corresponding to the error diffusion processing when the resolution in the sub-scanning direction is lower than the resolution in the main scanning direction as the input image data is read in and performs the color correction processing corresponding to the dither processing when the resolution in the sub-scanning direction is equal to or higher than the resolution in the main scanning direction as the input image data is read in and accordingly, even if the halftone processing is changed in response to the change of the input resolution, switching to the color correction processing corresponding to the halftone processing enables obtaining the output with hue unchanged despite the change of the input resolution.

The present invention is not only applied to the digital color copier but may also be applied to the digital color multi-functional peripheral equipped with a copier function, a printer function, a facsimile transmission function, a scan-to-email function, etc.

Likewise, the present invention may be applied to a monochrome copier or multi-functional peripheral as well.

The present invention is not limited to the above embodiment but needless to say, various alterations or modifications may be made thereto without departing from the spirit of the present invention. The objects of the present invention may naturally be achieved by, for example, preparing a program code (executable program, intermediate-code program, source program) that causes the computer to function as processing sections of the image processing apparatus that constitute the above embodiment, writing in advance the program code to a recording medium, reading the program code recorded on the recording medium and storing it in a memory or a storage apparatus provided in the apparatus, and executing the program code.

In this case, the program code itself read out from the recording medium realizes the function of the above embodiment and the program code and the recording medium recording the program code as well constitute the present invention.

The above program code also applies when the function of the above embodiment is realized by the above program code working jointly with an operating system or other application program, etc., based on an instruction of the program.

The program code realizing the function of the above embodiment may be provided in any form of recording medium such as a disc type (e.g., magnetic disc, optical disc, etc.), a card type (e.g., memory card, optical card, etc.), a semiconductor memory type (e.g., ROM, non-volatile memory, etc.), and a tape type (e.g., magnetic tape, cassette tape, etc.). The above program stored in the storage apparatus by way of the network or a broadcast wave may be provided directly from the computer as a distributor. In this case, the storage apparatus of the computer as the distributor as well is included in the recording medium of the present invention. The present invention may also be achieved in the form of a computer data signal embedded in a carrier wave, in which the above program code is embodied by electronic transmission.

According to the present invention, the image quality deterioration may be restrained of the image data read with the resolution in the sub-scanning direction set lower than the resolution in the main scanning direction with respect to the document containing text, halftone photographs, line drawings, photographs, etc.

For example, when the image is read at the resolution in the sub-scanning direction lower than the resolution in the main scanning direction, since the error diffusion processing is used as the halftone processing, no moire is caused. For this reason, the smoothing by the filter processing may be weakened and, for example, even if the text area is misjudged as the halftone area, the text area is weakly smoothed and therefore, the image quality deterioration may be restrained.

The invention claimed is:

1. An image processing apparatus, comprising:
   a segmentation process section that segments the input image data read in into plural areas comprising text areas and halftone areas;
   tone reproduction process section that applies halftone processing to the input image data; and
   a control section that turns off processing of the segmentation process section when the resolution in the sub-scanning direction is lower than the resolution in the main scanning direction as the input image date is read in, wherein
   the tone reproduction process section selects an error diffusion process section that applies error diffusion processing to the input image data, when a resolution in a sub-scanning direction is lower than a resolution in a main scanning direction and comprises
   a dither process section that applies dither processing to the input image data, when the resolution in the sub-scanning direction is equal to or higher than the resolution in the main scanning direction as the input image data is read in.

2. A non-transitory computer-readable recording medium recording the program according to claim 1.

3. The image processing apparatus according to claim 1, further comprising:
   a filter process section that applies sharpness processing and smoothing processing to the input image data.

4. The image processing apparatus according to claim 1, further comprising:
   a color correction section that applies color correction processing to the input image data read in, wherein
   the color correction section performs:
   the color correction processing corresponding to the error diffusion processing when the resolution in the sub-scanning direction is lower than the resolution in the main scanning direction as the input image data is read in; and
   the color correction processing corresponding to the dither processing when the resolution in the sub-scanning direction is equal to or higher than the resolution in the main scanning direction as the input image data is read in.

5. An image forming apparatus comprising the image processing apparatus according to claim 1.

6. An image processing apparatus that reads a document image at a resolution in a sub-scanning direction lower than a resolution in a main scanning direction and outputs after applying at least processing of making the resolution in the sub-scanning direction equal to the resolution in the main scanning direction, wherein
   the apparatus does not comprise a segmentation process section that segments the input image data into plural areas comprising text areas and halftone areas, but comprises a tone reproduction process section that applies halftone processing by error diffusion processing to input image data.

7. The image processing apparatus according to claim 6, further comprising:
   a filter process section that applies sharpness processing and smoothing processing to the input image data.

8. An image processing method comprising:
   a segmentation processing step of segmenting the input image data read in into plural areas comprising text areas and halftone areas;
   a tone reproduction processing step of applying halftone processing to the input image data read in; and
   a step of turning off processing of the segmentation process section and making processing of the tone reproduction processing step as error diffusion processing when the
   resolution in the sub-scanning direction is lower than the resolution in the main scanning direction as the input image data is read in; and
   making processing of the tone reproduction processing step as dither processing when the resolution in the sub-scanning direction is equal to or higher than the resolution in the main scanning direction as the input image data is read in.

9. A non-transitory computer-readable recording medium recording the program according to claim 8.

10. The image processing method according to claim 8, further comprising;
    a filter processing step of applying sharpness processing and smoothing processing to the input image data.

11. The image processing method according to claim 8, further comprising:
    a color correcting step of applying color correction processing to the input image data read in, wherein
    the color correcting step comprises the steps of:
    performing the color correction processing corresponding to the error diffusion processing on the input image data when the resolution in the sub-scanning direction is lower than the resolution in the main scanning direction as the input image data is read in; and
    performing the color correction processing corresponding to the dither processing on the input image data when the resolution in the sub-scanning direction is equal to or higher than the resolution in the main scanning direction as the input image data is read in.

* * * * *